US012254687B2

(12) United States Patent
Mishra et al.

(10) Patent No.: US 12,254,687 B2
(45) Date of Patent: Mar. 18, 2025

(54) METHOD AND SYSTEM TO DETECT COMPONENTS OF FACIAL RECOGNITION SYSTEM

(71) Applicant: Communications Test Design, Inc., West Chester, PA (US)

(72) Inventors: Sanket Mishra, Sacramento, CA (US); Nidhin Davis, Glen Mills, PA (US)

(73) Assignee: Communications Test Design, Inc., West Chester, PA (US)

( * ) Notice: Subject to any disclaimer, the term of this patent is extended or adjusted under 35 U.S.C. 154(b) by 459 days.

(21) Appl. No.: 17/931,488

(22) Filed: Sep. 12, 2022

(65) Prior Publication Data

US 2024/0087308 A1   Mar. 14, 2024

(51) Int. Cl.
| | |
|---|---|
| *G06V 10/98* | (2022.01) |
| *G06T 7/00* | (2017.01) |
| *G06V 10/58* | (2022.01) |
| *G06V 10/75* | (2022.01) |
| *G06V 40/12* | (2022.01) |

(52) U.S. Cl.
CPC .......... *G06V 10/987* (2022.01); *G06T 7/0004* (2013.01); *G06V 10/58* (2022.01); *G06V 10/98* (2022.01); *G06V 40/1365* (2022.01); *G06T 2207/10048* (2013.01); *G06T 2207/30108* (2013.01)

(58) Field of Classification Search
CPC ...... G06V 10/987; G06V 10/58; G06V 10/98; G06V 10/60; G06T 7/0004; G06T 2207/10048; G06T 7/001
See application file for complete search history.

(56) References Cited

U.S. PATENT DOCUMENTS

| | | | |
|---|---|---|---|
| 7,369,236 B1 * | 5/2008 | Sali .................. | G01N 21/95607 356/394 |
| 2011/0150341 A1 | 6/2011 | Yamamoto et al. | |
| 2018/0307270 A1 | 10/2018 | Pantel | |
| 2021/0116392 A1 * | 4/2021 | Fitzgerald ............ | G06K 7/1417 |
| 2021/0406350 A1 | 12/2021 | Chen et al. | |

OTHER PUBLICATIONS

Verger, R. (Sep. 14, 2017). Apple's new Face ID system uses a sensing strategy that dates back decades. Popular Science. https://www.popsci.com/apple-face-ID/ (Year: 2017).*

Team, F. (Jan. 8, 2021). How to detect infrared camera—Step by step guide. Futureapps.site. https://futureapps.site/how-to-detect-infrared-camera/ (Year: 2021).*

(Continued)

*Primary Examiner* — Sean M Conner
*Assistant Examiner* — David Alexander Wambst
(74) *Attorney, Agent, or Firm* — Duane Morris LLP

(57) ABSTRACT

A method of determining an operating status of one or more hardware components of a facial recognition system of a mobile device includes engaging the facial recognition system of the mobile device, wherein the facial recognition system comprises a dot projector and an infrared ("IR") camera; capturing an image of the dot projector and the IR camera; comparing the captured image to a predetermined test image; and based on the results of the comparison, determining the operating status of at least one of the dot projector and the IR camera.

24 Claims, 5 Drawing Sheets

(56) References Cited

OTHER PUBLICATIONS

Phryne. (Apr. 28, 2022). Troubleshooting Face ID. Ifixit. https://www.ifixit.com/Guide/Troubleshooting+iPhone+X+Face+ID+Not+Working+'Move+iPhone+a+Little+Lower-Higher'/128928 (Year: 2022).*

Poetker, B. (May 28, 2019). How to Use Portrait Mode on iPhone and Android. G2.com. https://learn.g2.com/portrait-mode (Year: 2019).*

International Search Report and Written Opinion for PCT/US2023/073877 issued Dec. 12, 2023, 13 pages.

* cited by examiner

METHOD AND SYSTEM TO DETECT COMPONENTS OF FACIAL RECOGNITION SYSTEM

BACKGROUND

The present disclosure relates to component testing. More specifically, the present invention relates to a method and system to detect operational status of optical components of a facial recognition system, for example, in a mobile device such as a smart phone, a tablet, and the like.

A facial recognition system implements pattern recognition to match a human face from a digital file against a baseline file or database of faces. Such a system can be employed to biometrically authenticate users by pinpointing and measuring facial features from a previously stored file to grant access or unlock something, for example, a door, a pathway, a vault, and a mobile device. Facial recognition systems attempt to identify a human face, which is three-dimensional (3D), and changes in appearance with lighting and facial expression based on a two-dimensional (2D) image.

Hardware components are used to create and store a baseline file representing a facial image used to match against another file created in real-time during authentication. For example, mobile device hardware components of a facial recognition system can include an infrared camera, a flood illuminator, a proximity sensor, an ambient light sensor, a camera, a dot projector, and a processor.

During initial set-up, the dot projector projects thousands of infrared dots on the face of the user. These dots of radiation are used to create and build a map of the user's face and then the infrared camera reads the dot structure of the face. With this data, the processor creates and stores a mathematical model of the user's face to generate a unique facial signature file. This file can be repeatedly updated and evolved as the user's facial features change.

During mobile device testing, operators manually check a facial recognition system for the mobile device under test to verify its operation. It has been found that using a photograph, a mask or mannequin will not work for mobile device testing because of the sophisticated technology of facial recognition systems. As a result, operators use their own face. For example, for testing a facial recognition authentication system in a mobile device, an operator initiates a set-up mode and attempts to capture and store an acceptable digital file representation of their face. Once in the set-up mode, the operator has to point the optical components of the facial recognition system towards their face and move the mobile device and their face relative to each other to capture the data points the facial recognition system needs to generate and store the facial signature file. Once set-up is complete, the operator then attempts to unlock the mobile device using the facial recognition system for authentication to verify operation of the facial recognition system. This testing sequence is a very labor-intensive manual process. Automating this process would save time, reduce cost, and increase accuracy.

SUMMARY

It is desirable to reliably test a facial recognition system for mobile devices using an automated process that is faster and more repeatable than a manual or semi-manual test method. Accordingly, the present disclosure provides a test system and test procedure that can be fully automated such that a digital image is captured of a mobile device while in a test mode to verify operation of hardware components required to be operational for the facial recognition system to work. This is much faster than a manual method. Additionally, such a test can be included with other automated tests of mobile device functionality in an automated test environment.

In an embodiment, a method of determining an operating status of one or more hardware components of a facial recognition system of a mobile device includes engaging the facial recognition system of the mobile device, wherein the facial recognition system comprises a dot projector and an infrared ("IR") camera; capturing an image of the dot projector and the IR camera; comparing the captured image to a predetermined test image; and based on the results of the comparison, determining the operating status of at least one of the dot projector and the IR camera.

In the method, engaging the facial recognition system of the mobile device can include turning on a front camera of the mobile device and putting the front camera into portrait mode.

In the method, the captured image and the predetermined test image are digital images.

In the method, the step of comparing the captured image to the predetermined image includes comparing a first portion of the captured image with a corresponding first portion of the predetermined test image. In the method, the first portion of the captured image receives IR illumination from the dot projector of the mobile device.

In the method, the step of comparing the captured image to the predetermined image includes comparing a second portion of the captured image with a corresponding second portion of the predetermined test image. In the method, the second portion of the captured image receives IR illumination from the IR camera of the mobile device.

In the method, the step of comparing the captured image to the predetermined image includes comparing a luminance value of a pixel or group of pixels of the captured image with a luminance value of a corresponding pixel or group of pixels of the predetermined test image.

In another embodiment, a system determines an operating status of one or more hardware components of a facial recognition system of a mobile device, the system comprising: a test apparatus configured to receive a mobile device, the test apparatus comprising: a memory device configured to store a predetermined test image; an input connection configured to operatively connect to the mobile device; an imaging device; and a processor operatively connected to the memory device, the input connection, and the imaging device, wherein the processor transmits, via the input connection to the mobile device, instructions causing the mobile device to engage a facial recognition system comprising a dot projector and an IR camera, the processor transmits to the imaging device instructions to capture an image of the mobile device after the facial recognition system is engaged and transmit the captured image to the processor, the processor, upon receipt of a captured image of the mobile device by the imaging device, compares the captured image with the predetermined test image from the memory device, and the processor, based on the results of the comparison, determines the operating status of at least one of the dot projector and the IR camera.

In the system, engaging the facial recognition system of the mobile device includes turning on a front camera of the mobile device and putting the front camera into portrait mode.

In the system, the captured image and the predetermined test image are digital images.

In the system, comparing the captured image to the predetermined image includes comparing a first portion of the captured image with a corresponding first portion of the predetermined test image. In the system, the first portion of the captured image receives IR illumination from the dot projector of the mobile device.

In the system, comparing the captured image to the predetermined image includes comparing a second portion of the captured image with a corresponding second portion of the predetermined test image. In the system, the second portion of the captured image receives IR illumination from the IR camera of the mobile device.

In the system, comparing the captured image to the predetermined image includes comparing a luminance value of a pixel or group of pixels of the captured image with a luminance value of a corresponding pixel or group of pixels of the predetermined test image.

In an embodiment, a non-transitory, machine-readable medium having stored thereon a plurality of executable instructions, that when executed by a processor, the plurality of instructions comprising instructions to engage a facial recognition system of a mobile device, wherein the facial recognition system comprises a dot projector and an infrared ("IR") camera; capture an image of the dot projector and the IR camera; compare the captured image to a predetermined test image; and based on the results of the comparison, determine the operating status of at least one of the dot projector and the IR camera.

The above and other features, elements, characteristics, steps, and advantages of the present invention will become more apparent from the following detailed description of preferred embodiments of the present invention with reference to the attached drawings.

DETAILED DESCRIPTION

Figure 1:
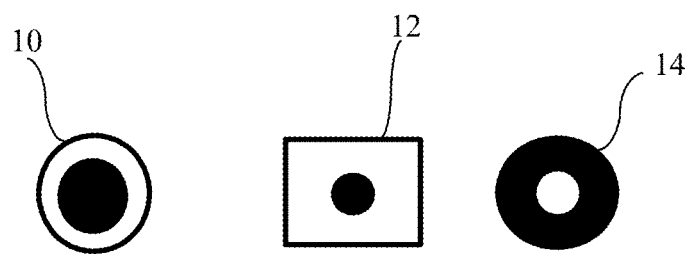
FIG. 1 is a diagram of optical components of a facial recognition system.

Hardware components of a facial recognition system can include an infrared (IR) camera, a flood illuminator, a proximity sensor, an ambient light sensor, a front camera, a dot projector, and a processor. For example, the optical components can be included in a so-called "TrueDepth strip" or any other suitable location of a mobile device. FIG. 1 is an image representing components of a facial recognition system including a camera 10, a dot projector 12, and an IR camera 14. Although shown in a left-to-right arrangement, the components of the facial recognition system and those of FIG. 1 can be arranged in any suitable orientation with respect to each other and other components of the mobile device. The components of the facial recognition system are typically adjacent to the electronic display of the mobile device. It has been found that the dot projector 12 and the IR camera 14 must be functional for the facial recognition system to work in certain mobile devices. If one of these two components are defective the facial recognition system will not work properly.

Failures of a facial recognition system of a mobile device can be caused by a defect of the dot projector or IR camera. It is assumed that software associated with the facial recognition system in any particular mobile device is working properly and not otherwise corrupted or nonoperational. Thus, testing of the hardware components becomes a surrogate for testing the entire facial recognition system.

Verification of the operation of the dot projector 12 and the IR camera 14 of a mobile device can be automated by putting the mobile device into a certain mode where the dot projector 12 and the IR camera 14 should be turned on and then verifying that these components are, in fact, turned on. If these components do not turn on when they should be turned on, the facial recognition system will not operate.

Figure 2:
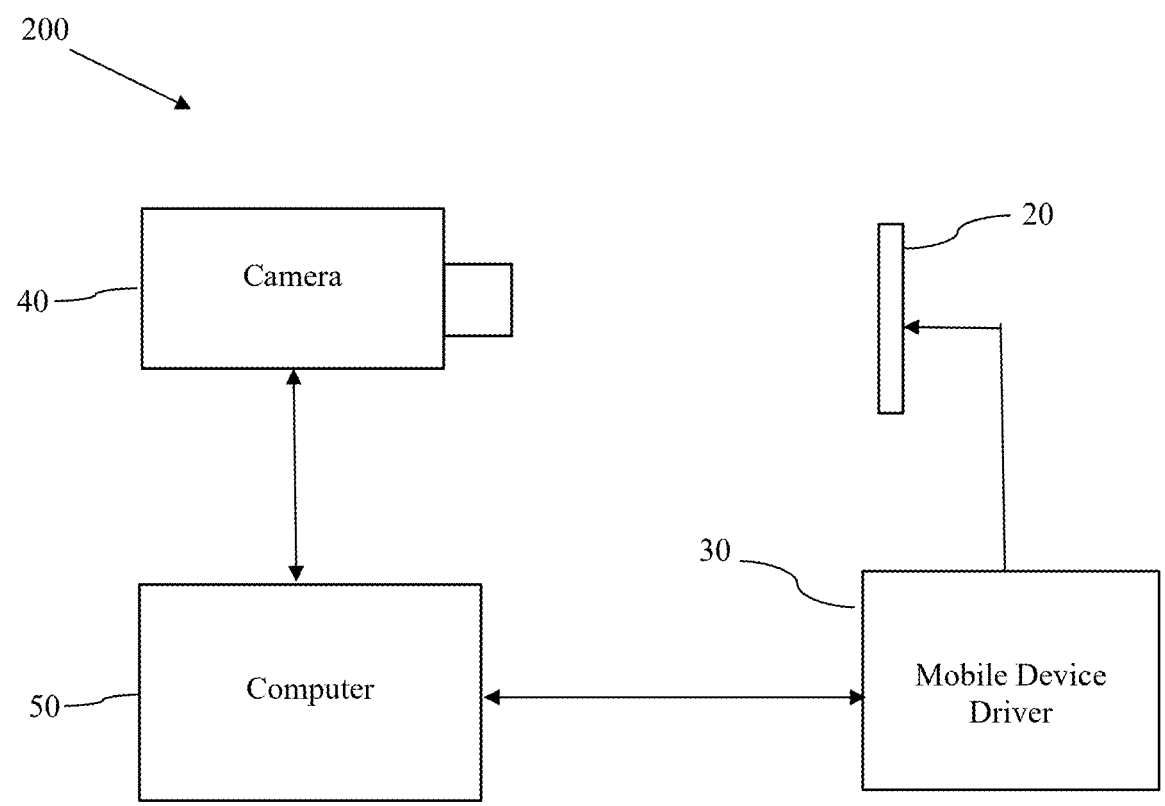
FIG. 2 is a diagram representing a testing arrangement according to an embodiment of the disclosure.

Although not required, preferably a mobile device under test can be mounted in an automated test apparatus. Optionally, testing can be performed manually or semi-automated. FIG. 2 is a block diagram of a test system 200 used to verify operation of the dot projector 12 and the IR camera 14 of a mobile device 20 under test, according to one embodiment. FIG. 2 shows that the mobile device 20 under test can be driven by a mobile device driver 30 to put the mobile device 20 into a test mode for testing. A camera 40, for example a digital camera with sensitivity into the infrared range, driven by a computer 50 can be used to capture and store digital images of the mobile device 20 during testing. Optionally, the computer 50 can be used to control the mobile device driver 30. Optionally, the mobile device driver 30, the camera 40, and the computer 50 can be components of an automated test system used to functionally test the mobile device 20. Optionally, the test system can include an input connection configured to operatively connect to the mobile device 20.

The computer 50 can include a processor and a memory for storage. The computer can be a stand-alone central processing unit or a decentralized network of computers.

Optionally, the memory can be separate from the computer 50. The memory can include storage of an application to control the camera 40, an application for an operator to interface with the computer 50 or test system 200, and images captured by the camera 40 or previously stored, such as a predetermined test image.

In an embodiment for a certain model or family of mobile devices, a mobile device can be put into the test mode by engaging the facial recognition system/function of the mobile device, e.g., unlocking the mobile device, if locked, opening a camera application in the mobile device, initiating the front camera (i.e., the camera used to set-up and verify facial recognition), and, for some mobile devices, switching the camera application to portrait mode. In this mode, the dot projector and the IR camera should be on. Optionally, the processor can transmit, via the input connection to the mobile device 20, instructions causing the mobile device 20 to engage the facial recognition system.

Because the dot projector typically works by projecting thousands of beams or dots in the infrared spectrum, outside the visible spectrum, a naked eye cannot be used to verify if such a dot projector is working. However, a sensor sensitive in the infrared spectrum can be used to determine if the dot projector is emitting infrared radiation. Such an infrared sensor can include the digital camera 40 with a CCD sensor sensitive in the spectrum in which the dot projector emits.

Figure 3:
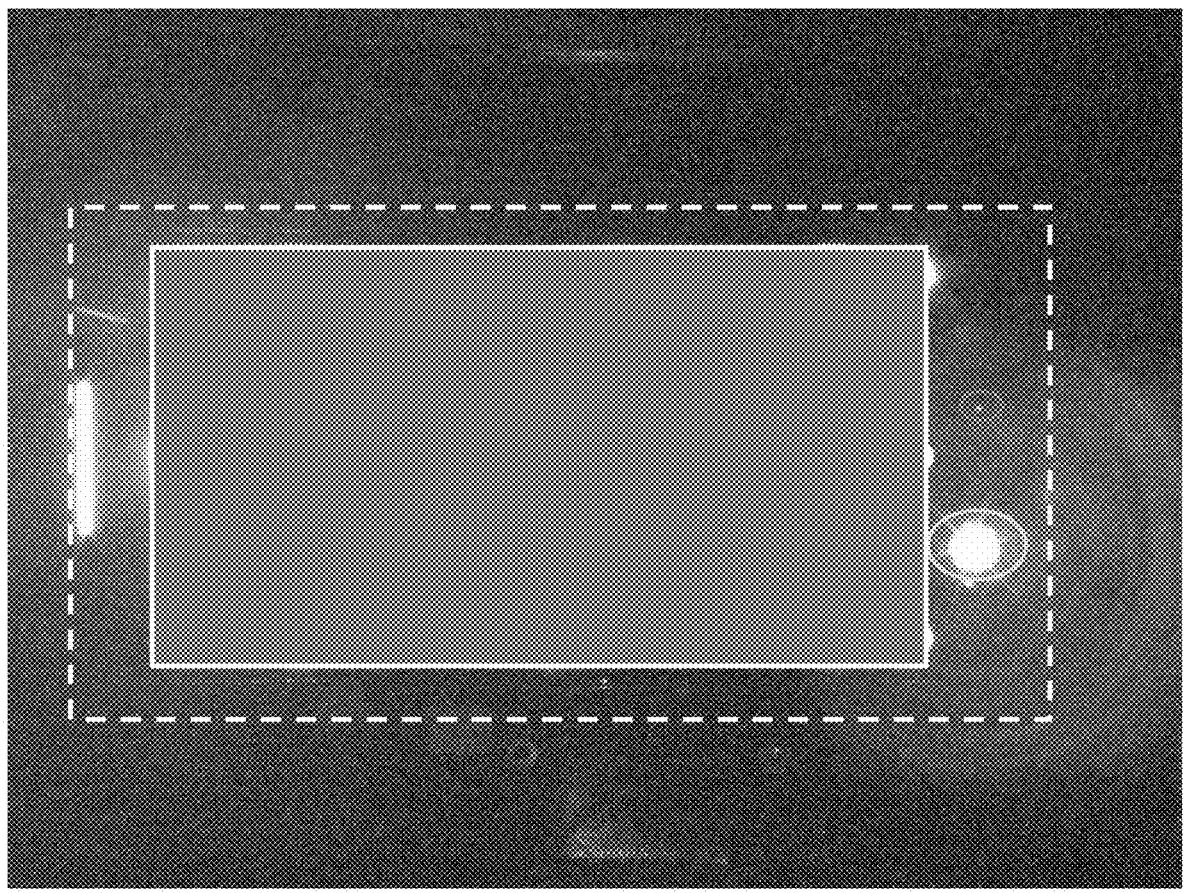
FIG. 3 is an image of a mobile device during testing components of a facial recognition system.
Figure 4:
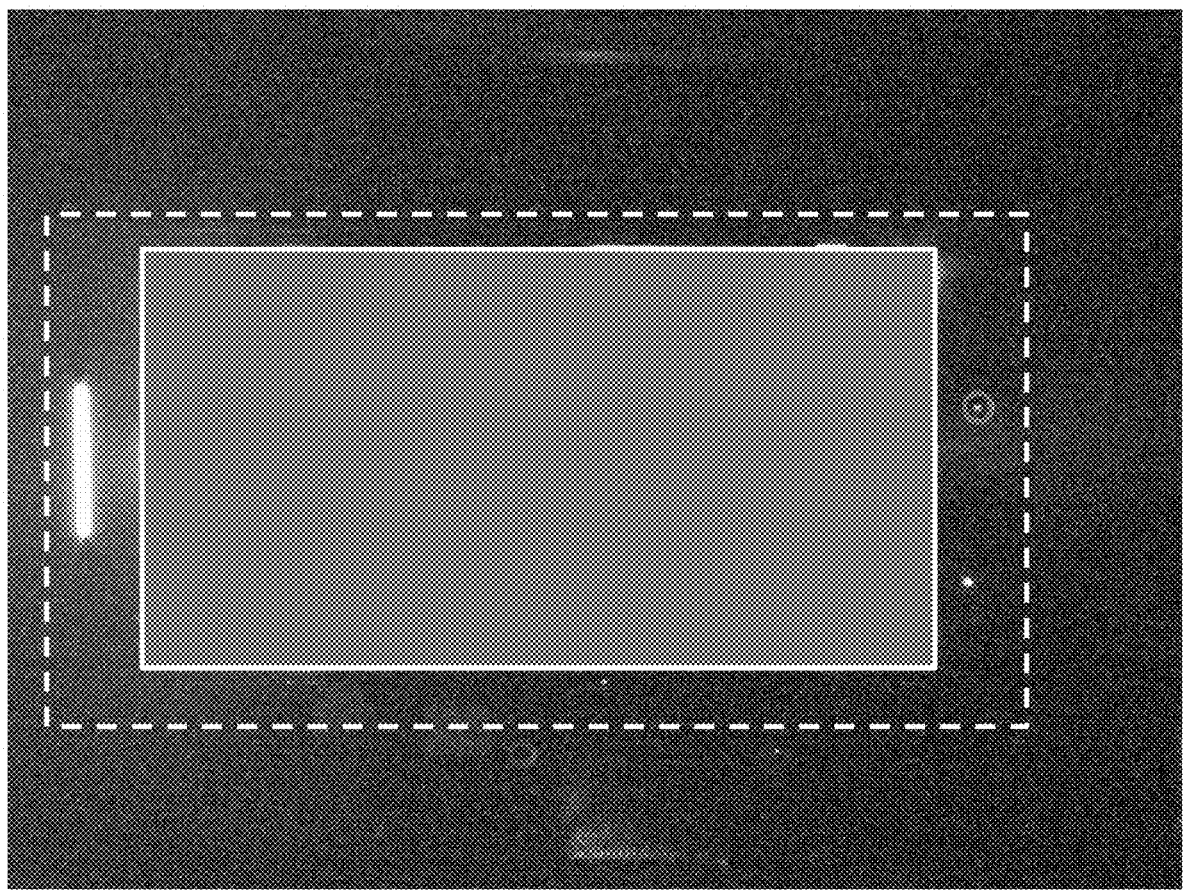
FIG. 4 is an image of a mobile device during testing components of a facial recognition system.

FIGS. 3 and 4 are examples of digital images of mobile devices captured while testing hardware components of a facial recognition system according to an embodiment of the present disclosure. The digital images of FIGS. 3 and 4 were taken in a dark chamber using a testing set-up like that shown in FIG. 2. Because the images were taken in a dark ambient environment of mobile devices with a dark case, the outline of the mobile devices is not visible and is represented by the dotted rectangle. For simplicity of the figures, most areas of the electronic displays have been blocked by a gray rectangle.

Prior to capturing the digital images of FIGS. 3 and 4, the mobile devices were put into a test mode in which the dot protector was expected to be on. At this point, IR radiation should be emitted from the dot projector and the IR camera. After put into the test mode, the images of FIGS. 3 and 4 of the mobile devices were captured by a digital camera.

FIG. 3 shows a mobile device with the dot projector on and emitting IR radiation within the yellow circle. The IR camera is emitting IR radiation shown within the green circle. Thus, this mobile device would be considered as passing this test. FIG. 4 shows a mobile device with the dot projector not emitting IR radiation while the IR camera is emitting IR radiation shown within the green circle. Thus, this mobile device would be considered as failing this test because the dot projector is not projecting.

Figure 5:
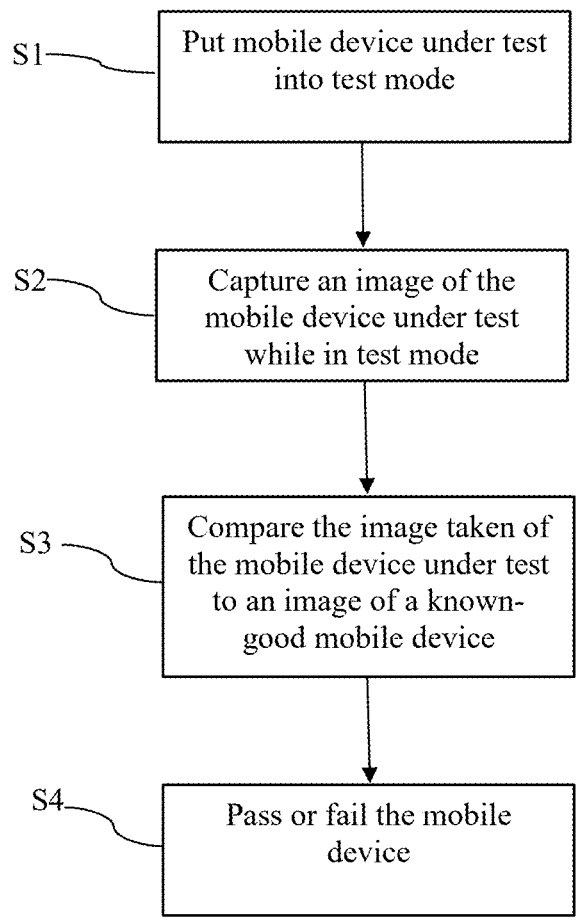
FIG. 5 is a flowchart of a method to detect operational status of optical components of a facial recognition system, according to an exemplary embodiment.

In an embodiment, a test method is described with respect to the flowchart provided in FIG. 5. This test method can be fully automated and performed using a hardware set up like that shown in FIG. 2. In step S1, a mobile device under test is put into a test mode. The test mode can be any combination of user actions or commands that are meant to power on the dot projector and the IR camera of the mobile device. For example, the test mode can be a set-up mode of a facial recognition application. In one aspect, the mobile device is put into the test mode by opening the front camera and switching to portrait mode. The mobile device can be put into the test mode by a user or an automated mobile device driver. Optionally, instructions can be transmitted to the mobile device causing the mobile device to be put into the test mode by engaging the facial recognition system using software commands or an application.

In step S2, a captured image, e.g., an image or a digital image of the mobile device under test, is obtained with a camera or a digital camera or sensor with sensitivity into the IR range covering the wavelengths emitted by the dot projector and the IR camera. In an embodiment, the image or digital image of the mobile device under test includes a first portion and a second portion. In a further embodiment, the first portion receives IR illumination from the dot projector. In a still further embodiment, the second portion receives IR illumination from the IR camera.

In step S3, the digital image captured in step S2 is compared with a predetermined test image, such as, for example an image or digital image previously taken of a like known-good mobile device, one in which it is known that the dot projector and the IR camera are working and turned on. In an embodiment, the predetermined test image includes a first portion and a second portion. In an embodiment, the first portion of the predetermined test image corresponds to the first portion of the captured image. In a further embodiment, the first portion of the predetermined test image receives IR illumination from the dot projector of the like known-good mobile device. In an embodiment, the second portion of the predetermined test image corresponds to the second portion of the captured image. In a still further embodiment, the second portion of the predetermined test image receives IR illumination from the IR camera of the like known-good mobile device.

In an embodiment, the comparison of the captured image with the predetermined test image includes comparing a luminance value of a pixel or group of pixels of the captured image with a luminance value of a corresponding pixel or group of pixels of the predetermined test image. The image of the known-good mobile device will show that the dot projector and the IR camera are emitting IR radiation, for example, like that shown in FIG. 3. Digital data of pixels of the captured image and the known-good image can be characterized in terms of x-y position and representative luminance value. This allows for a comparison of the two images in the digital domain which can be automated.

Based on the results of step S3, the operating status of the dot projector and the IR camera is determined and the test of the facial recognition hardware components of the mobile device under test is passed or failed. If the dot projector and the IR camera are emitting IR radiation, then the mobile device passes the test. The mobile device will fail the test if either of the dot projector and the IR camera are not emitting IR radiation.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Additionally, or alternatively, the above-described embodiments can be implemented as a non-transitory computer readable storage medium embodied thereon a program executable by a processor for performing a method of various embodiments. Such a non-transitory, machine-readable medium can have stored thereon a plurality of executable instructions to perform methods described herein.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method of determining an operating status of one or more hardware components of a facial recognition system of a mobile device, the method comprising:
    engaging the facial recognition system of the mobile device to put the mobile device into a test mode, wherein the facial recognition system comprises a dot projector and an infrared ("IR") camera;
    while the mobile device is in the test mode, capturing an image of the dot projector and the IR camera;
    comparing the captured image to a predetermined test image; and
    based on the results of the comparison, determining the operating status of at least one of the dot projector and the IR camera.

2. The method of claim 1, wherein engaging the facial recognition system of the mobile device includes turning on a front camera of the mobile device and putting the front camera into portrait mode.

3. The method of claim 1, wherein the captured image and the predetermined test image are digital images.

4. The method of claim 1, wherein the step of comparing the captured image to the predetermined image includes comparing a first portion of the captured image with a corresponding first portion of the predetermined test image.

5. The method of claim 4, wherein the first portion of the captured image receives IR illumination from the dot projector of the mobile device.

6. The method of claim 5, wherein the step of comparing the captured image to the predetermined image includes comparing a second portion of the captured image with a corresponding second portion of the predetermined test image.

7. The method of claim 6, wherein the second portion of the captured image receives IR illumination from the IR camera of the mobile device.

8. The method of claim 1, wherein the step of comparing the captured image to the predetermined image includes comparing a luminance value of a pixel or group of pixels of the captured image with a luminance value of a corresponding pixel or group of pixels of the predetermined test image.

9. A system to determine an operating status of one or more hardware components of a facial recognition system of a mobile device, the system comprising:
a test apparatus configured to receive a mobile device, the test apparatus comprising:
a memory device configured to store a predetermined test image;
an input connection configured to operatively connect to the mobile device;
an imaging device; and
a processor operatively connected to the memory device, the input connection, and the imaging device, wherein
the processor transmits, via the input connection to the mobile device, instructions causing the mobile device to engage a facial recognition system to put the mobile device into a test mode, the facial recognition system comprising a dot projector and an IR camera,
the processor transmits to the imaging device instructions to capture an image of the mobile device while the mobile device is in the test mode and after the facial recognition system is engaged and transmit the captured image to the processor,
the processor, upon receipt of a captured image of the mobile device by the imaging device, compares the captured image with the predetermined test image from the memory device, and
the processor, based on the results of the comparison, determines the operating status of at least one of the dot projector and the IR camera.

10. The system of claim 9, wherein engaging the facial recognition system of the mobile device includes turning on a front camera of the mobile device and putting the front camera into portrait mode.

11. The system of claim 9, wherein the captured image and the predetermined test image are digital images.

12. The system of claim 9, wherein comparing the captured image to the predetermined image includes comparing a first portion of the captured image with a corresponding first portion of the predetermined test image.

13. The system of claim 12, wherein the first portion of the captured image receives IR illumination from the dot projector of the mobile device.

14. The system of claim 12, wherein comparing the captured image to the predetermined image includes comparing a second portion of the captured image with a corresponding second portion of the predetermined test image.

15. The system of claim 14, wherein the second portion of the captured image receives IR illumination from the IR camera of the mobile device.

16. The system of claim 9, wherein comparing the captured image to the predetermined image includes comparing a luminance value of a pixel or group of pixels of the captured image with a luminance value of a corresponding pixel or group of pixels of the predetermined test image.

17. A non-transitory, machine-readable medium having stored thereon a plurality of executable instructions, that when executed by a processor, the plurality of instructions comprising instructions to:
engage a facial recognition system of a mobile device to put the mobile device into a test mode, wherein the facial recognition system comprises a dot projector and an infrared ("IR") camera;
while the mobile device is in the test mode, capture an image of the dot projector and the IR camera;
compare the captured image to a predetermined test image; and
based on the results of the comparison, determine the operating status of at least one of the dot projector and the IR camera.

18. The non-transitory, machine-readable medium of claim 17, wherein engaging the facial recognition system of the mobile device includes turning on a front camera of the mobile device and putting the front camera into portrait mode.

19. The non-transitory, machine-readable medium of claim 17, wherein the captured image and the predetermined test image are digital images.

20. The non-transitory, machine-readable medium of claim 17, wherein comparing the captured image to the predetermined image includes comparing a first portion of the captured image with a corresponding first portion of the predetermined test image.

21. The non-transitory, machine-readable medium of claim 20, wherein the first portion of the captured image receives IR illumination from the dot projector of the mobile device.

22. The non-transitory, machine-readable medium of claim 17, wherein comparing the captured image to the predetermined image includes comparing a second portion of the captured image with a corresponding second portion of the predetermined test image.

23. The non-transitory, machine-readable medium of claim 22, wherein the second portion of the captured image receives IR illumination from the IR camera of the mobile device.

24. The non-transitory, machine-readable medium of claim 17, wherein comparing the captured image to the predetermined image includes comparing a luminance value of a pixel or group of pixels of the captured image with a luminance value of a corresponding pixel or group of pixels of the predetermined test image.

* * * * *